United States Patent
Maetz et al.

(10) Patent No.: US 8,219,828 B2
(45) Date of Patent: Jul. 10, 2012

(54) METHODS AND A DEVICE FOR SECURE SOFTWARE INSTALLATION

(75) Inventors: Yves Maetz, Melesse (FR); Eric Diehl, Liffre (FR); Alain Durand, Rennes (FR); Michel Morvan, Parthenay de Bretagne (FR)

(73) Assignee: Thomson Licensing, Boulogne-Billancourt (FR)

( * ) Notice: Subject to any disclaimer, the term of this patent is extended or adjusted under 35 U.S.C. 154(b) by 938 days.

(21) Appl. No.: 12/002,691

(22) Filed: Dec. 18, 2007

(65) Prior Publication Data
US 2008/0159540 A1    Jul. 3, 2008

(30) Foreign Application Priority Data

Dec. 20, 2006 (EP) .................................. 06301277

(51) Int. Cl.
*G06F 21/00* (2006.01)
(52) U.S. Cl. ...................................................... 713/190
(58) Field of Classification Search .................. 713/190
See application file for complete search history.

(56) References Cited

U.S. PATENT DOCUMENTS

| | | | |
|---|---|---|---|
| 5,473,692 A | 12/1995 | Davis | |
| 6,075,862 A * | 6/2000 | Yoshida et al. | 380/28 |
| 6,223,288 B1 * | 4/2001 | Byrne | 713/190 |
| 6,226,747 B1 | 5/2001 | Larsson et al. | |
| 7,143,297 B2 * | 11/2006 | Buchheit et al. | 713/193 |
| 2003/0023966 A1 | 1/2003 | Shimizu et al. | |
| 2003/0041243 A1 | 2/2003 | Olguin et al. | |
| 2003/0115147 A1 * | 6/2003 | Feldman et al. | 705/64 |
| 2004/0093419 A1 * | 5/2004 | Weihl et al. | 709/229 |
| 2005/0005137 A1 * | 1/2005 | Benedikt | 713/189 |
| 2005/0039006 A1 | 2/2005 | Stelling et al. | |
| 2006/0073890 A1 | 4/2006 | McAllister et al. | |
| 2007/0061580 A1 * | 3/2007 | Venkatesan et al. | 713/176 |
| 2008/0005032 A1 * | 1/2008 | Znidarsic | 705/59 |

FOREIGN PATENT DOCUMENTS

| | | |
|---|---|---|
| DE | 101 34 356 A1 | 1/2003 |
| DE | 10134356 A1 * | 1/2003 |
| EP | 1 184 771 A1 | 3/2002 |
| WO | WO03029936 | 4/2003 |

OTHER PUBLICATIONS

Search Report May 16, 2007.
Buchheit M: "Software-Kopierschutz" Elektronik, Weka Fachzeitschriftenverlag, Poing, DE vol. 41, No. 14, Jul. 7, 1992, pp. 68-74, XP000307635 ISSN: 0013-5658 p. 71, col. 2, paragraph 2—p. 74, col. 2, paragraph 1.

* cited by examiner

*Primary Examiner* — Michael S McNally
(74) *Attorney, Agent, or Firm* — Tutunjian & Bitetto, P.C.

(57) ABSTRACT

A method for secure installation of software applications. The user receives the software, partly encrypted, and an installation token for a number of licenses from the software provider, plugs the software and the installation token into a computer, and launches the installation application. A Secure Authenticated Channel is established between the installation application and the installation token and a unique identifier of the computer is sent thereon to the installation token. The installation token verifies that there are remaining licenses, decreases the remaining licenses, authorizes the installation and sends the decryption key and a certificate/key pair to the installation application that decrypts and installs the software, preferably linking the installation to the computer's identifier. A variant allows (virtually) unlimited installations of time limited programs that are transformed into time unlimited programs once the installation token has reported the number to the software provider and paid for the necessary licenses. Also provided is the installation token.

7 Claims, 2 Drawing Sheets

METHODS AND A DEVICE FOR SECURE SOFTWARE INSTALLATION

This application claims the benefit, under 35 U.S.C. §119, of European Patent Application No. 06301277.7 filed Dec. 20, 2006.

FIELD OF THE INVENTION

The present invention relates generally to software installation, and in particular to software installation with secure license count.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Software manufacturers that sell software products for which the customers buy a number of licenses naturally wish to ensure that the customers do not install a software product on more computers (or more generally, platforms) than they pay licenses for. In addition, the manufacturers and the customers share a desire to have a simple-to-use method of installing the software product.

US 2003/0023966 A1 teaches a system that allows a customer to install a software a limited number of times. An install limited count and an install count are stored in a protected area of a removable recording medium. Whenever the software is installed, a comparison is made to ensure that the install count does not exceed the install limited count.

US 2005/0039006 A1 teaches a system in which an authorization medium (a floppy disk) is used to limit the number of installations of a software. The floppy disk comprises a list of serial numbers for devices onto which the software may be installed. Alternatively, the floppy disk keeps track of the number of performed installations and refuses to install the software if a predetermined number of installations have been performed.

US 2006/0073890 A1 teaches a system in which a license count is stored on an electronic key. Once the main processor of the downloading machine accesses the key to transfer a license, the license count is decreased. The user may access a remote server so as to update the license count on the key, i.e. to buy further licenses.

US 2003/0041243 A1 teaches a system in which a physical key is used to control the software installation. The key comprises information on the number of performed installations and the maximum number of installations. In addition, the number of performed installations is reduced in case the software is successfully uninstalled while the physical key is connected to the computer.

U.S. Pat. No. 6,226,747 B1 teaches a system in which a floppy disk is used to control installations of software. The floppy disk allows a limited number of installations and uses fingerprinting of the downloading machines to allow uninstallation of the software to increase the number of available licenses, and re-installation after a crash on the machine.

US 2005/0005137 A1 teaches a system in which a license key is stored on a floppy disk. Installation of the software is only temporary until the license key is communicated to a remote server that makes sure that the software corresponding to the license is installed only once. If this is verified, the remote server sends information so as to render the installation permanent.

A further solution is the use of a dongle associated with each software license. In order to make the software on a certain machine run, it is necessary to connect the dongle to the machine first.

The present invention attempts to remedy at least some of the problems concerns connected with the prior art, enabling a user to install software while respecting the licenses associated with the software.

SUMMARY OF THE INVENTION

In a first aspect, the invention is directed to a method of installing software on a first device. The first device, executing an installation application, is functionally connected to a second device and to a support storing the at least partly encrypted software. A secure connection is established between the installation application and the second device. A decryption key for the encrypted software and a certificate/private key pair are sent from the second device to the installation application that decrypts the software. The installation application then installs the software, linking the software to the certificate, so that the software, when executed, may verify that the certificate is stored on the first device.

In a preferred embodiment, the installation application provides an identity of the first device to the second device and links the installation to the identity, so that the software, when executed, may verify that it runs on a first device corresponding to the identity.

In a further preferred embodiment, the certificate/private key pair is unique.

It is preferred that the second device stores a number of certificate/private key pairs and associates each received identifier to a previously non-associated certificate/key pair. The second device advantageously verifies that it stores at least one non-associated certificate/private key pair and aborts the installation if no such pair is available.

In an alternate embodiment, the installed software is time-limited. The second device connects to a server and reports a number of software installations performed since a precedent connection. Upon validation of the software installations, the time limit is extended or the time-limited installed software is transformed into permanent installed software. The extension of the time limit or the transformation of the time-limited installed software is advantageously performed upon reception by the first device of a transformation code issued by the server.

In a further preferred embodiment, the secure connection is a Secure Authenticated Channel established using certificate/private key pairs of the second device and of the installation application. The certificate/private key pairs used for the establishment of the Secure Authenticated Channel are different than the certificate/private key pair transferred from the second device to the installation application.

In a second aspect, the invention is directed to an installation token adapted to partake in a method of installing software according to the invention. The installation token comprises a processor adapted to establish a Secure Authenticated Channel between with an installation application, a secure memory adapted to store at least one certificate/private key pair, and an interface adapted to send a decryption key for the encrypted software and a certificate/private key pair to the installation application.

In a preferred embodiment, the secure memory is further adapted to store at least one identifier of a first device on which the software has been installed.

BRIEF DESCRIPTION OF THE DRAWINGS

The various features and advantages of the present invention and its preferred embodiments will now be described with reference to the accompanying drawings which are intended to illustrate and not to limit the scope of the present invention and in which.

DETAILED DESCRIPTION OF PREFERRED EMBODIMENTS

Figure 1:
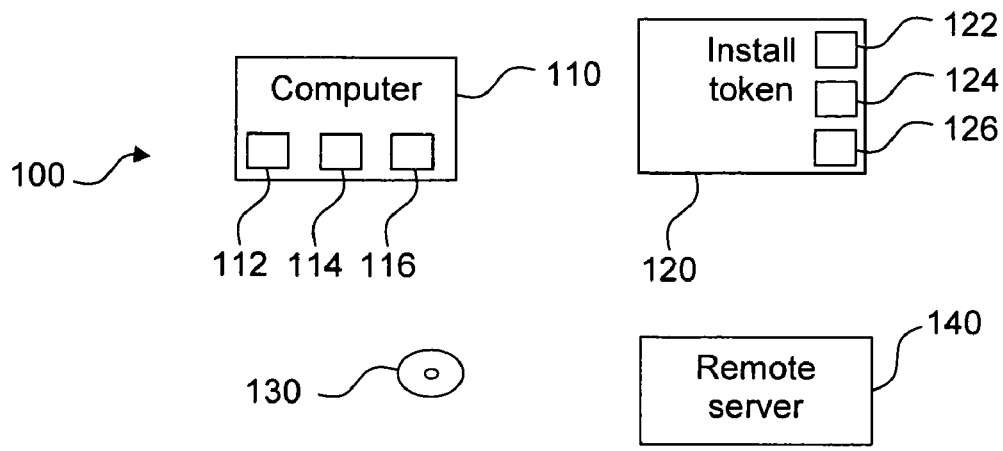
FIG. 1 illustrates an environment for installation of software according to preferred embodiments of the invention.

FIG. 1 illustrates an environment 100 for installation of software according to preferred embodiments of the invention. The environment 100 comprises a computer 110 onto which the software is to be installed, an installation token 120, an encrypted copy of the software 130 and a remote server 140.

The computer 110 comprises an interface 112 adapted to interact with the installation token 120, an interface 114 adapted to download the software 130, and an interface 116 adapted to interact with the remote server.

The installation token 120 may for example be a secure token or a Universal Serial Bus (USB) key and comprises a processor 122, a secure memory 124, and, in one alternative embodiment, a real-time clock 126. The installation token comprises a certificate/private key pair for use in establishing one or more secure connections, as will be further described hereinafter. The installation token 120 is provided by a software provider, as is the software 130.

The software 130 may reside on one or more CD-ROMs or any other suitable kind of storage medium. The software 130 may also be stored on a remote storage medium that is accessible through a network, such as a local network or the Internet.

Figure 2:
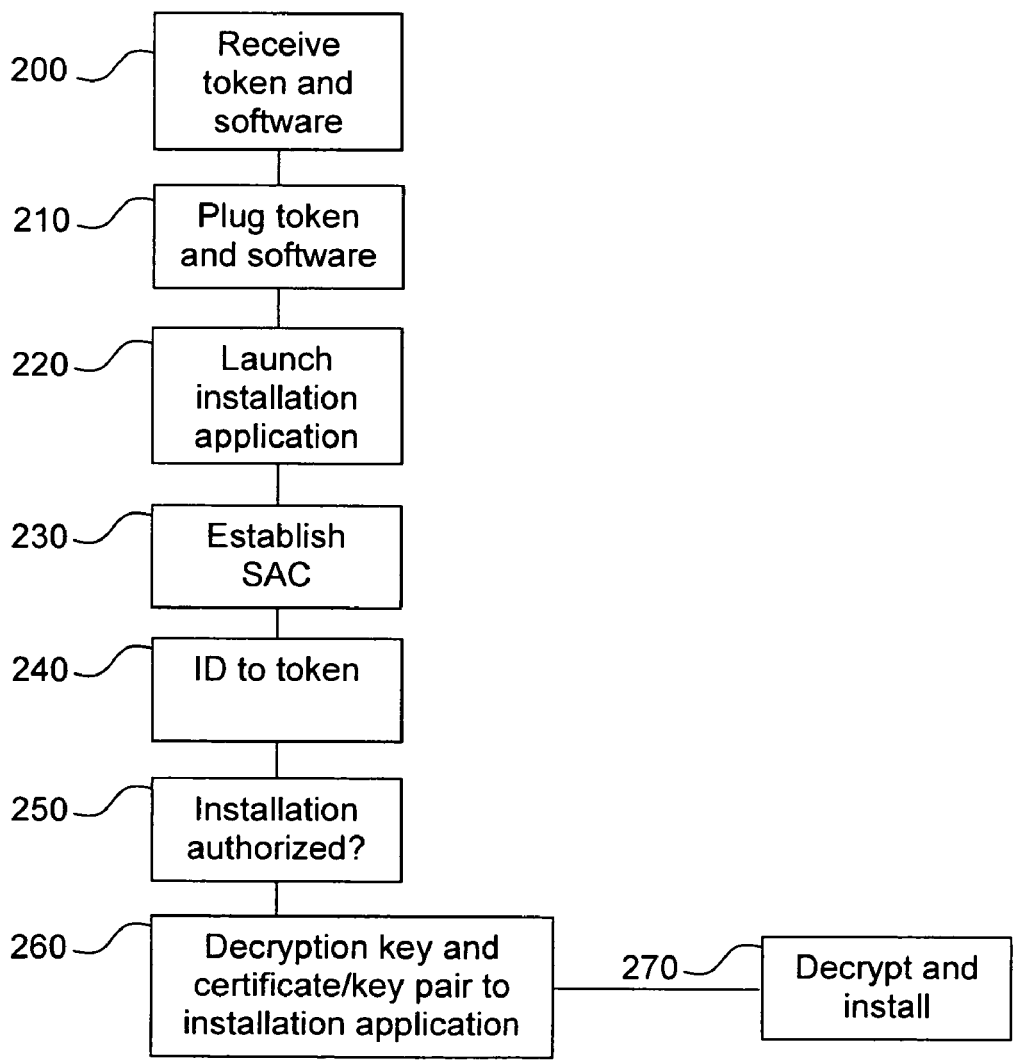
FIG. 2 illustrates a preferred method of software installation according to the invention.

FIG. 2 illustrates a preferred method of software installation according to the invention. In step 200, the user receives an installation token and a copy of the software directly or indirectly from the software manufacturer. In the exemplary embodiment, it is assumed that the software is delivered encrypted on a CD-ROM and that the installation token is a USB key that has been initiated to permit ten installations of the software.

The user then connects 210 the installation token to the computer and puts the CD-ROM in the appropriate reader, after which the user launches 220 the installation application for the software. It should be noted that the installation application is not encrypted and that it thus may be launched even without an appropriate key or license.

The installation application comprises a certificate/public key pair that may be common for a plurality of installation applications or unique and dedicated for use with a specific installation token. Using the certificate, the installation application then establishes 230 a Secure Authenticated Channel (SAC) with the installation token using any suitable method known in the art. An identifier for the computer is sent 240 over the SAC to the installation token. The identifier is preferably unique (or at least quasi-unique) to the computer and may for example be a serial number of the computer, a serial number of the motherboard, a serial number of the network card, the MAC address, the hard disk serial number, the type of processor, or a combination thereof. The identifier (also known as a fingerprint of the computer) is calculated according to any suitable method known in the art and is preferably used for hardware soldering, as will be described further hereinafter.

The installation token keeps a list of identifiers in its secure memory, where it also keeps the number of remaining licenses, in other words how many more times the software may be installed. The secure memory also stores a number of preferably distinct certificate/private key pairs: one pair used by the USB key itself in establishing secure connections, one pair for each remaining license, and possibly also pairs corresponding to already installed licenses.

If the installation is authorized, step 250, the installation token sends 260 over the SAC at least one decryption key necessary for the decryption of the software, the key being stored in the secure memory of the installation token. The installation token also sends over the SAC a certificate/private key pair for use with the license, the certificate/private key pair being different from the certificate/private key pairs used for the establishment of the SAC. The installation token then modifies the number of remaining licenses so that one less installation may be performed. In the example, the installation token was initiated with ten licenses, which means that only nine remain after the first installation.

Upon reception of the decryption key, the installation application decrypts and installs 270 the software, linking the installed software to the certificate. As the certificate is given to only one software installation, this software is personalized. The installation of the software is also linked to the computer using the identifier for the computer. It is preferred that each time the software is run, it verifies the certificate and also that it runs on the computer corresponding to the identifier. If this is the case, then the software continues to run; if not, the software stops running. Linking the software to the computer makes bit-to-bit copies of the software impossible.

Once the installation is ready, the user may take the installation token and the software to another computer in order to install it there as well.

When the user has run out of licenses, the user may for example return the installation token to the software supplier or an authorized retailer in order to buy further licenses. Alternatively, it is also possible for the user to run a specific application by which payment is effected via the Internet to the remote server that remotely modifies the number of licenses on the installation token.

In a variant, the identifier of the computer is not sent to the installation token in step 240, in which case no list of identifiers is stored by the installation token. However, the use of identifiers is preferred as it enables re-installation of the software on a computer that for example has crashed, without the need to use a further license.

It is advantageous that the software is delivered with an uninstall application that allows the user to uninstall the software on a computer, in which case the installation token increases the number of remaining licenses and, in case the list of identifiers is used, removes the identifier from this list. In this variant, it may be advantageous that the installation token store the certificate/key pair for installed incenses so that the pair may be reused easily.

In a further variant, a remote computer or server 140 may perform the functions of the installation token 120 in the embodiments described hereinbefore. The installation application contacts the remote computer or server 140 over a network in order to establish the SAC, after which the method proceeds as described hereinbefore. It should be noted that the server for use with this variant is not necessarily the same, although it preferably is the same, as the server for use in the method described with reference to FIG. 3.

Figure 3:
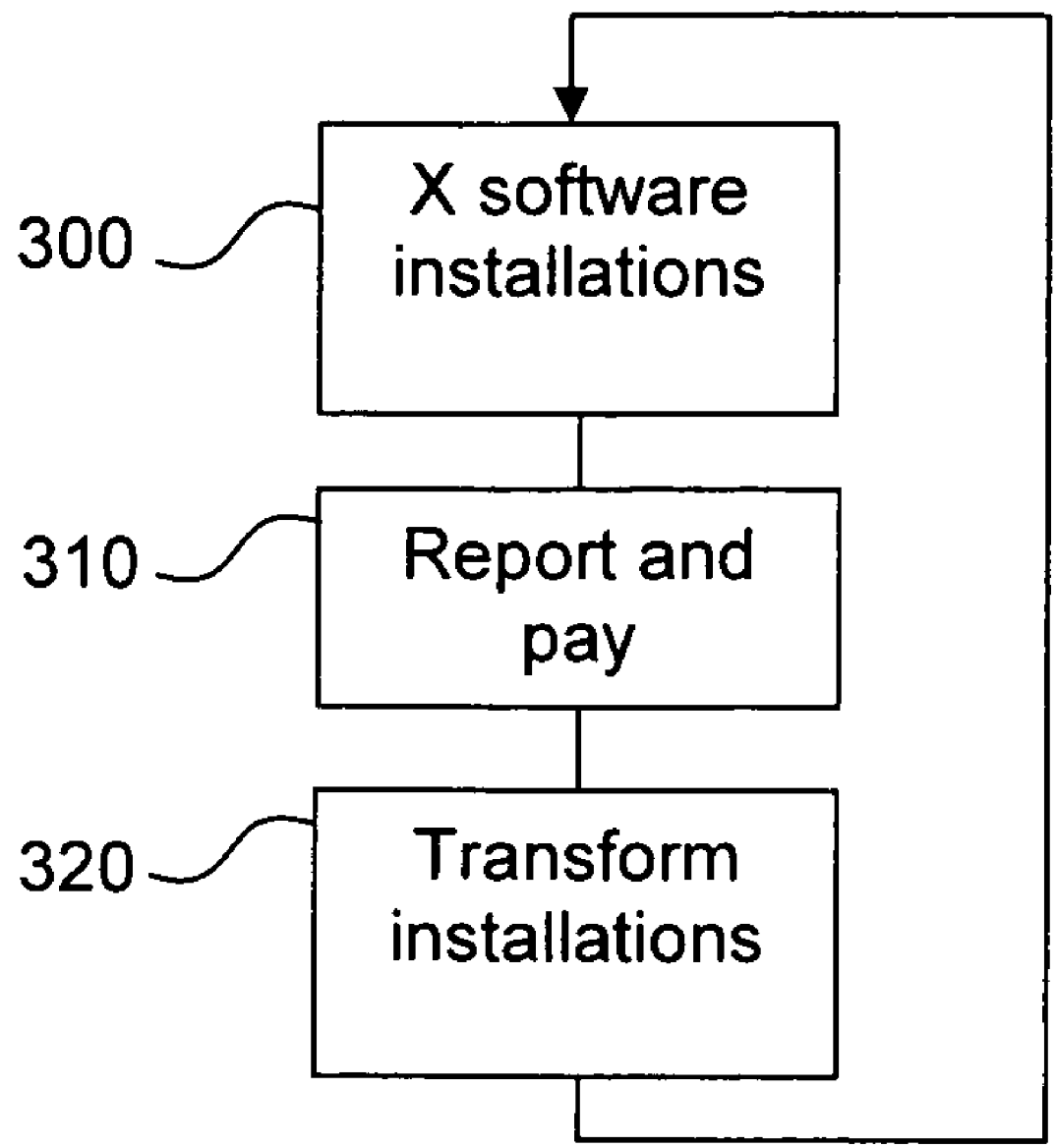
FIG. 3 illustrates an alternative preferred embodiment of a method for software installation according to the invention.

FIG. 3 illustrates an alternative preferred embodiment of a method for software installation according to the invention. This embodiment advantageously uses the installation token with a real-time clock, as described hereinbefore.

In step 300, the user installs the software X times on as many computers. The software is preferably installed according to the method described with reference to FIG. 2. It should be noted that it is not necessary, although it is preferable, to limit the number of licenses, especially as it is preferred to install a certificate/key pair with each installation of the software (although the invention may also be used without the use of a certificate to which the software installation is linked or a certificate common to more than one installation). It is also possible to make the number of possible licenses so great in respect to the expected number of used licenses that they appear limitless to the user, such as if the possibility of 100 licenses is furnished to a user that normally wants no more than 30 licenses.

The user then reports 310 the number of licenses to the software provider and pays for these licenses. There are many possibilities as to when the user should report and pay, such as for example when a certain pre-set number of licenses have been installed, when the user deems that the software will not be installed again for a while, or at a certain time, such as within one month of the latest report or reception of the installation token. The latter option is the preferred one, although it may be combined with one or both of the other options. The user preferably reports by connecting the installation token to the Internet and running a specified application that also enables the user to pay.

In a variant, the method then returns to step 300, in which the user may install the software again, but in a preferred variant, the software that is installed on the computers is time limited. If the installed software does not receive a code from the remote server within a specified time—that preferably is linked to the reporting interval—then the software ceases to work. However, once the user has reported and validated the licenses (e.g. by paying for them) in step 310, the remote server provides the necessary codes for each software installation to become permanent (i.e. not limited in time) or for the time limit to be extended. It is preferred that a code is linked to a specific software installation in order to ascertain that a code is not reused for other installations. This may be achieved by having the installation token create a unique code based on the identifier of the computer, and having the installation program modify the installation. The code may be provided to the software installation by the server directly, provided that an address was provided to the installation token by the installation application, or via the installation token, in which case the installation token must be connected, at least indirectly, to the network upon which the platform with a software installation is located.

It can thus be appreciated that the present invention improves upon the prior art by providing flexible software installation that respects the software provider's rights.

The above the specification, examples and drawings provide a complete description of the manufacture and use of the composition of the invention. Since many embodiments of the invention can be made without departing from the spirit and scope of the invention, the invention resides in the claims herein after appended.

Each feature disclosed in the description and (where appropriate) the claims and drawings may be provided independently or in any appropriate combination. Features may, where appropriate be implemented in hardware, software, or a combination of the two.

Reference herein to "one embodiment" or "an embodiment" means that a particular feature, structure, or characteristic described in connection with the embodiment can be included in at least one implementation of the invention. Any appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. A method of installing software on a first device, the first device being functionally connected to a second device and to a support storing the software, the software being at least partly encrypted, the first device executing an installation application, the method comprising the steps, at the first device executing the installation application, of:
    establishing a secure connection with the second device;
    providing an identity of the first device to the second device;
    receiving a decryption key for the encrypted software and a certificate/private key pair from the second device;
    decrypting the software;
    verifying by the second device that it stores at least one non-associated certificate/private key pair and aborting the installation if no such pair is available; and
    installing the software, linking the software to the certificate and the installation to the identity, so that the software, when executed, may verify that the certificate is stored on the first device and that the software runs on a first device corresponding to the identity,
    wherein the second device stores a number of certificate/private key pairs and associates each received identifier to a previously non-associated certificate/key pair.

2. The method of claim 1, wherein the certificate/private key pair is unique.

3. The method of claim 1, wherein the installed software is time-limited, the method further comprising the steps of: connecting by the second device a server; reporting by the second device to the server a number of software installations performed since a precedent connection to the server; and upon validation of the software installations, extending the time limit or transforming the time-limited installed software into permanent installed software.

4. The method of claim 1, wherein the time limit is extended or the time-limited installed software is transformed upon reception by the first device of a transformation code issued by the server.

5. The method of claim 1, wherein the secure connection is a Secure Authenticated Channel established using certificate/private key pairs of the second device and of the installation application, the certificate/private key pairs used for the establishment of the Secure Authenticated Channel being different than the certificate/private key pair transferred from the second device to the installation application.

6. A method of installing software on a first device, the first device being functionally connected to a second device and to a support storing the software, the software being at least partly encrypted, the first device executing an installation application, the method comprising the steps, at the first device executing the installation application, of:

establishing a secure connection with the second device;

receiving a decryption key for the encrypted software and a certificate/private key pair from the second device;

decrypting the software; and installing the software, linking the software to the certificate, so that the software, when executed, may verify that the certificate is stored on the first device; and wherein the second device is an installation token configured to assist in the method of installing software in the first device, the installation token comprising:

a processor adapted to establish a Secure Authenticated Channel with the installation application;

a secure memory configured to store at least one certificate/private key pair; and an interface configured to send a decryption key for the encrypted software and a certificate/private key pair to the installation application.

7. The method of claim 6, wherein the secure memory is further configured to store at least one identifier of a first device on which the software has been installed.

* * * * *